United States Patent
Whittle et al.

(10) Patent No.: US 11,118,620 B2
(45) Date of Patent: Sep. 14, 2021

(54) AIRCRAFT BRAKE TORQUE LOAD REACTION THROUGH LANDING GEAR BOGIE STRUCTURE

(71) Applicant: Goodrich Corporation, Charlotte, NC (US)

(72) Inventors: Scott Whittle, Springboro, OH (US); Richard A. Kipp, Oakwood, OH (US); Nathaniel J Herrmann, Springfield, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/786,854

(22) Filed: Feb. 10, 2020

(65) Prior Publication Data

US 2020/0173489 A1 Jun. 4, 2020

Related U.S. Application Data

(62) Division of application No. 15/699,682, filed on Sep. 8, 2017, now Pat. No. 10,598,209.

(51) Int. Cl.
*F16D 55/24* (2006.01)
*F16C 3/02* (2006.01)
(Continued)

(52) U.S. Cl.
CPC ............... *F16C 3/02* (2013.01); *B64C 25/42* (2013.01); *F16D 55/24* (2013.01); *F16D 65/02* (2013.01);
(Continued)

(58) Field of Classification Search
CPC .... F16D 65/0056; F16D 65/02; F16D 65/125; F16D 65/127; F16D 65/853; F16D 55/24;
(Continued)

(56) References Cited

U.S. PATENT DOCUMENTS 4,659,040 A 4/1987 Sinclair
5,437,352 A * 8/1995 Harker ..................... F16D 55/36
188/18 A (Continued)

FOREIGN PATENT DOCUMENTS

CN 104596697 5/2015
DE 102011116005 12/2012
(Continued)

OTHER PUBLICATIONS

USPTO, Requirement for Restriction dated Dec. 21, 2018 in U.S. Appl. No. 15/699,682.
(Continued)

*Primary Examiner* — Christopher P Schwartz
(74) *Attorney, Agent, or Firm* — Snell & Wilmer L.L.P.

(57) ABSTRACT

An aircraft landing gear arrangement may comprise a landing gear bogie having an axle, a torque tube surrounding the axle and mechanically coupled to the landing gear bogie. A brake stack may surround the torque tube. The torque tube may comprise a cylindrical body extending between a first end and a second end. A flange may be disposed at the first end. A mating surface may be disposed on the first end or the second end of the torque tube for mating the torque tube to the landing gear bogie. A bogie flange may extend from the landing gear bogie whereby the torque tube may be mounted to the landing gear bogie.

13 Claims, 8 Drawing Sheets

(51) Int. Cl.
  *B64C 25/42* (2006.01)
  *F16D 65/02* (2006.01)
  *B64C 25/34* (2006.01)
  *F16D 55/40* (2006.01)

(52) U.S. Cl.
  CPC .......... *B64C 25/34* (2013.01); *F16C 2326/43* (2013.01); *F16C 2361/45* (2013.01); *F16D 55/40* (2013.01); *F16D 2065/1388* (2013.01)

(58) Field of Classification Search
  CPC ........ F16D 55/36; F16D 55/40; F16D 55/224; B64C 25/02; B64C 25/12; B64C 25/20; B64C 25/34; B64C 25/44; B64C 25/62; B64C 25/405
  USPC .................. 188/18 A, 71.5, 71.6, 72.1, 72.7; 244/100 R, 103 S, 111
  See application file for complete search history.

(56) References Cited

U.S. PATENT DOCUMENTS

| | | | | |
|---|---|---|---|---|
| 5,494,138 A * | 2/1996 | Scelsi | ..................... | F16D 55/36 188/18 A |
| 5,503,254 A * | 4/1996 | Fisher | ..................... | F16D 55/36 188/218 XL |
| 5,862,890 A * | 1/1999 | Long | ..................... | F16D 55/36 188/71.6 |
| 6,095,293 A * | 8/2000 | Brundrett | ................ | F16D 55/36 188/18 A |
| 6,581,730 B1 * | 6/2003 | Haydon | .................. | B60T 1/065 188/18 A |
| 6,662,907 B1 * | 12/2003 | Brundrett | ................ | F16D 55/36 188/71.6 |
| 7,051,845 B2 * | 5/2006 | Thorp | ..................... | F16D 55/36 188/71.6 |
| 7,909,146 B2 * | 3/2011 | Dyko | ................... | F16D 55/025 188/71.5 |
| 9,670,975 B1 * | 6/2017 | Rook | ..................... | B64C 25/42 |
| 9,759,278 B2 * | 9/2017 | Rook | ................. | F16D 65/006 |
| 2005/0205366 A1 | 9/2005 | Plantan | | |
| 2015/0151833 A1 | 6/2015 | Cox | | |
| 2016/0152326 A1 | 6/2016 | Martin | | |

FOREIGN PATENT DOCUMENTS

| | | |
|---|---|---|
| EP | 0555822 | 8/1993 |
| EP | 1626001 | 2/2006 |
| EP | 2165087 | 3/2010 |
| WO | 9501518 | 1/1995 |
| WO | 0120187 | 3/2001 |

OTHER PUBLICATIONS

USPTO, Non-Final Office Action dated Jun. 4, 2019 in U.S. Appl. No. 15/699,682.

USPTO Notice of Allowance dated Nov. 13, 2019 in U.S. Appl. No. 15/699,682.

European Patent Office, European Search Report dated Jan. 18, 2019 in Application No. 18191520.8.

European Patent Office, European Office Action dated Nov. 12, 2020 in Application No. 18191520.8.

* cited by examiner

900

910 — Positioning a torque tube to surround an axle

920 — Moving the torque tube axially towards a landing gear bogie

930 — Positioning a mating surface of the torque tube in contact with a bogie flange

AIRCRAFT BRAKE TORQUE LOAD REACTION THROUGH LANDING GEAR BOGIE STRUCTURE

CROSS REFERENCE TO RELATED APPLICATIONS

This application is a divisional of, and claims priority to, and the benefit of U.S. patent application Ser. No. 15/699,682, filed on Sep. 8, 2017, and entitled "AIRCRAFT BRAKE TORQUE LOAD REACTION THROUGH LANDING GEAR BOGIE STRUCTURE" which is incorporated by reference herein in its entirety.

FIELD

The present disclosure relates to aircraft braking systems, and, more specifically, to systems and methods for torque and thermal conduction paths for aircraft braking systems.

BACKGROUND

Aircraft often include one or more landing gear that comprise one or more wheels. A braking system is coupled to the wheel(s) in order to decelerate or park the aircraft. Aircraft brake torque is typically reacted either by a spline drive or bolted flange configuration that ties the torque plate to the aircraft axle or through a torque pin that extends from the landing gear structure which engages the brake piston housing. The forgoing configurations allow minimal heat conduction from the brake to the landing gear bogie. Thermal conduction is currently limited to that which flows radially inward from the heat sink, through the torque plate, and into the mass of the aircraft axle.

SUMMARY

A torque tube for an aircraft brake is disclosed herein, in accordance with various embodiments.

A torque tube for an aircraft brake, comprising, a cylindrical body extending between a first end and a second end, and a mating surface disposed on the flange, the mating surface configured to engage a landing gear bogie.

In various embodiments, the torque tube is configured to be in mechanical communication with a brake stack and is configured to transfer torque from the brake stack to the landing gear bogie.

In various embodiments, the torque tube is configured to be in thermal communication with a brake stack and is configured to transfer heat from the brake stack to the landing gear bogie.

In various embodiments, the mating surface comprises an axially facing surface.

In various embodiments, the mating surface comprises a radially facing surface.

In various embodiments, the cylindrical body is configured to receive a plurality of rotating discs and a plurality of stators around an outer diameter (OD) surface of the cylindrical body.

In various embodiments, the torque tube further comprises a flange disposed at the second end, wherein the flange extends radially inward from the cylindrical body.

In various embodiments, the torque tube further comprises a flange disposed at the first end, wherein the flange is configured to be coupled to an end plate, wherein the flange comprises a plurality of apertures circumferentially disposed in the flange for coupling the end plate.

In various embodiments, a radially extending wall extending between a first tubular portion of the cylindrical body and a second tubular portion of the cylindrical body is provided.

In various embodiments, the torque tube further comprises a flange disposed at the first end, wherein the flange extends radially outward from the second tubular portion of the cylindrical body.

An aircraft landing gear arrangement, comprising a landing gear bogie having an axle, a torque tube having a flange, the torque tube surrounding the axle and mechanically coupled to the landing gear bogie via a bogie flange, and a brake stack surrounding the torque tube.

In various embodiments, the torque tube defines a mechanical load path from the brake stack to the landing gear bogie via the flange.

In various embodiments, the torque tube defines a thermal load path from the brake stack to the landing gear bogie via the flange.

In various embodiments, the flange comprises a mating surface in contact with the landing gear bogie.

In various embodiments, the bogie flange extends from the landing gear bogie, the flange mechanically coupled to the landing gear bogie via the bogie flange.

In various embodiments, the torque tube extends between a first end and a second end, the flange being disposed at the first end.

In various embodiments, the mating surface is on an axially facing surface of the flange.

In various embodiments, the mating surface is disposed on a radially outward facing surface of the flange.

A method of installing a torque tube to a landing gear bogie, comprising positioning the torque tube around an axle extending from the landing gear bogie, and moving the torque tube axially towards the landing gear bogie until the torque tube mechanically engages the landing gear bogie.

In various embodiments, the method further comprises positioning a mating surface of the torque tube in contact with a bogie flange extending from the landing gear bogie, wherein the mating surface comprises at least one of an axially facing surface and a radially outward facing surface of an inboard end of the torque tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

During braking, the brakes of an aircraft convert kinetic energy into heat. This heat may cause aircraft brakes to rise to high temperatures, such as well over 1500° F. (815° C.), for example after landing and/or a rejected take off. Aircraft brake hardware thus may be sized and configured to accommodate such thermal loads. The landing gear of an aircraft may have a large thermal capacity. Accordingly, in various embodiments, an aircraft brake may be configured to transfer heat to an aircraft landing gear (e.g., a landing gear bogie). In various embodiments, as heat is transferred to the landing gear, other aircraft brake components may be sized and configured so as to accommodate reduced thermal loads, resulting, in various embodiments, to aircraft brakes having, for example, reduced weight, number of parts, and/or complexity, among other things.

Figure 1:
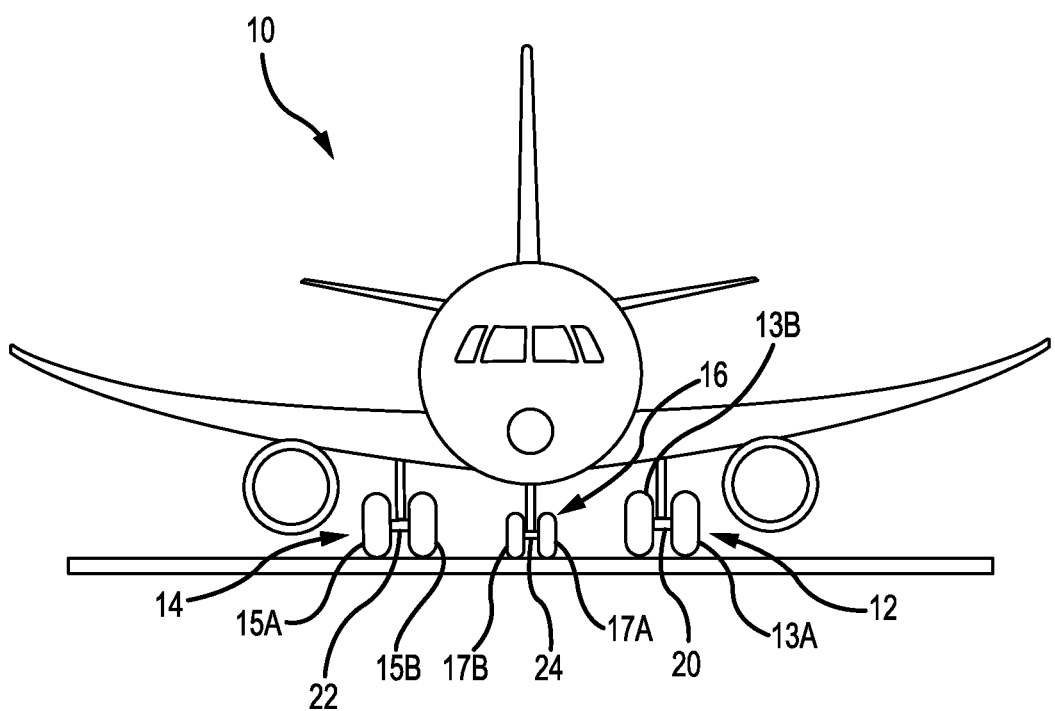
FIG. 1 illustrates an aircraft, in accordance with various embodiments.
Figure 1:
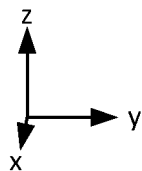

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An XYZ axes is used throughout the drawings to illustrate the axial (y), forward (x) and vertical (z) directions relative to axle 22.

Figure 2A:
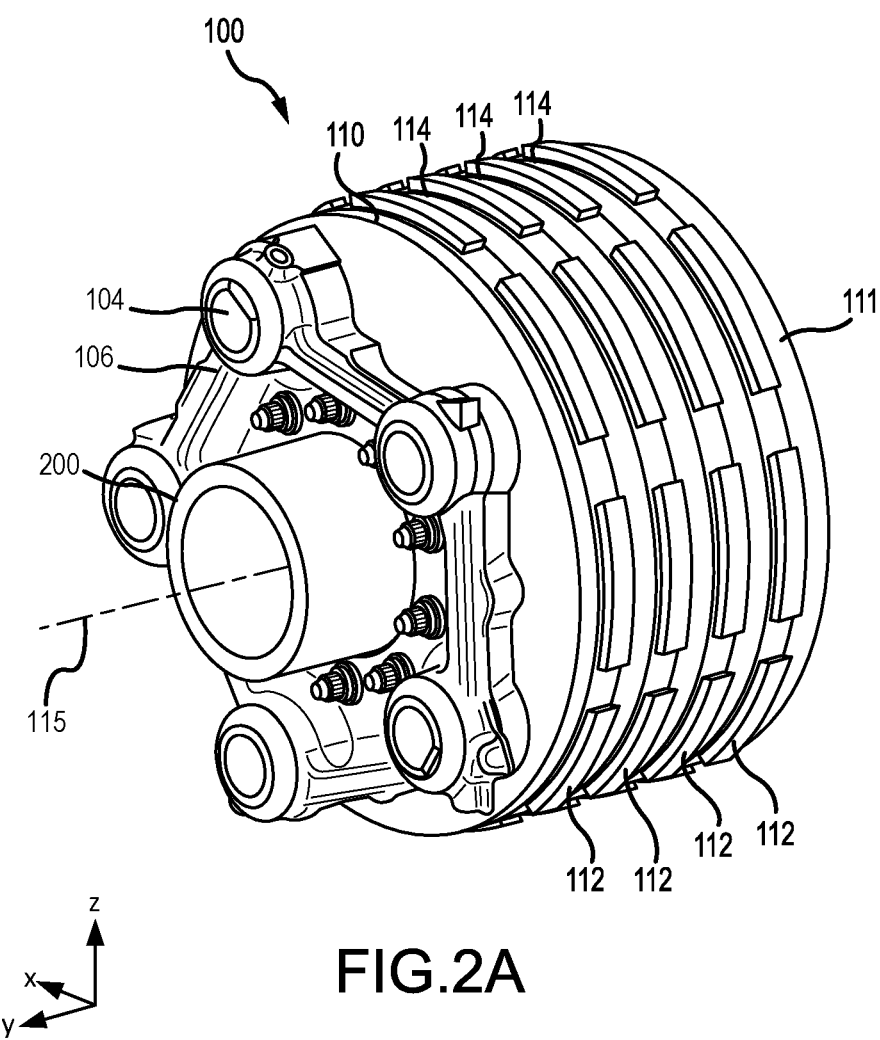
FIG. 2A illustrates an aircraft brake, in accordance with various embodiments.

FIG. 2A illustrates an aircraft brake 100 in accordance with various embodiments. Aircraft brake 100 may include a plurality of brake actuators 104, an end plate 111, a pressure plate 110, and a plurality of rotating discs 112 and stators 114 (collectively referred to herein as a brake stack) positioned in an alternating fashion between end plate 111 and pressure plate 110. Plurality of brake actuators 104 may be mounted to actuator mounting plate 106. Rotating discs 112 may rotate about an axis 115 and the stators 114 may have little to no angular movement relative to axis 115. Wheels (such as wheel 15A and wheel 15B, with brief reference to FIG. 1) may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. When sufficient force is exerted on rotating discs 112 via pressure plate 110, the rotation of rotating discs 112 will slow and eventually stop.

In order to exert this force onto pressure plate 110, an actuator motor may cause brake actuator 104 to actuate, and in various embodiments, hydraulic pressure may cause brake actuator 104 to actuate, depending on whether the brakes are electromechanical or hydraulic.

Figure 2B:
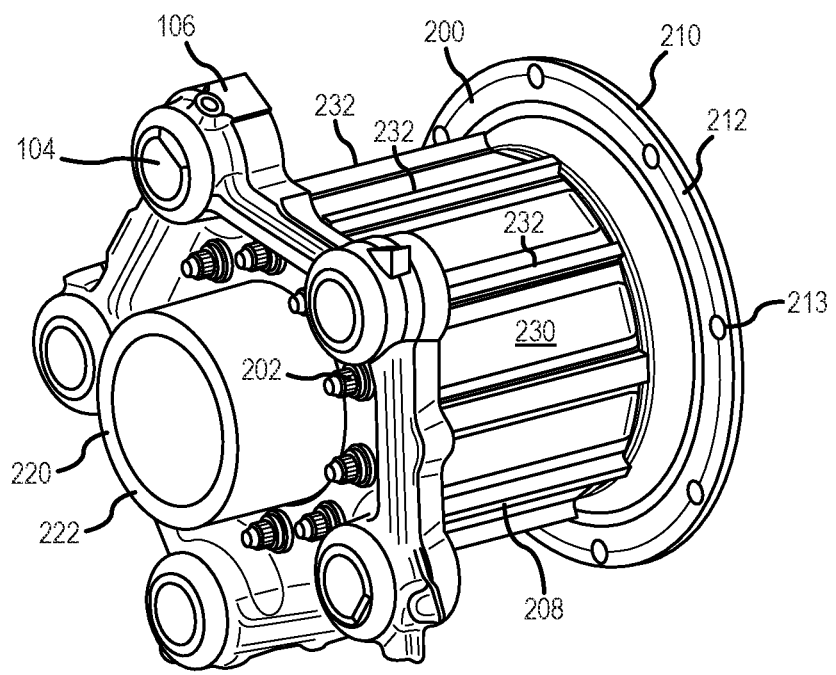
FIG. 2B illustrates a perspective view of a torque tube with an actuator plate installed onto the torque tube, in accordance with various embodiments.
Figure 2C:
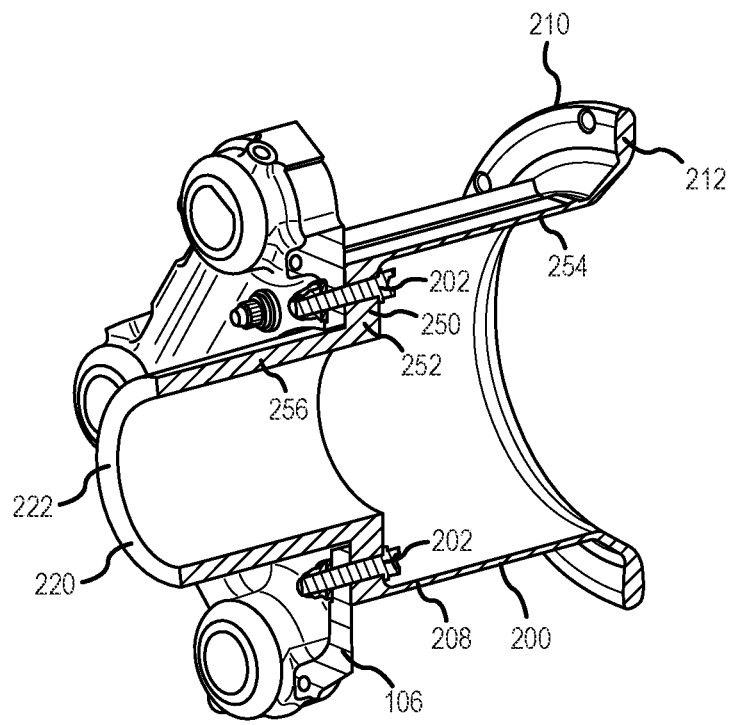
FIG. 2C illustrates a sectional view of the torque tube with the actuator of FIG. 2B, in accordance with various embodiments.

Plurality of rotating discs 112 and plurality of stators 114 may surround a torque tube 200. With reference to FIG. 2B and FIG. 2C, torque tube 200 coupled to actuator mounting plate 106 is illustrated, in accordance with various embodiments. Torque tube 200 may comprise a tubular body 208 extending between a first end 210 and a second end 220. A flange (also referred to herein as a first flange) 212 may be disposed at first end 210 of torque tube 200. Flange 212 may be configured to be coupled to end plate 111, for example via a plurality of apertures 213 circumferentially disposed in flange 212. An outer diameter (OD) surface 230 of torque tube 200 may comprise a plurality of axially extending ridges 232. Stated differently, a plurality of axially extending ridges 232 may be circumferentially disposed along OD surface 230.

In various embodiments, actuator mounting plate 106 may be coupled to torque tube 200 via a plurality of fasteners 202. Actuator mounting plate 106 may be disposed between first end 210 and second end 220. In various embodiments, torque tube 200 may comprise a stepped portion 250 comprising a radially extending wall 252 extending between a first tubular portion 254 and a second tubular portion 256. The first tubular portion 254 may comprise a diameter which is greater than the diameter of the second tubular portion 256. Actuator mounting plate 106 may be coupled to radially extending wall 252.

Figure 3:
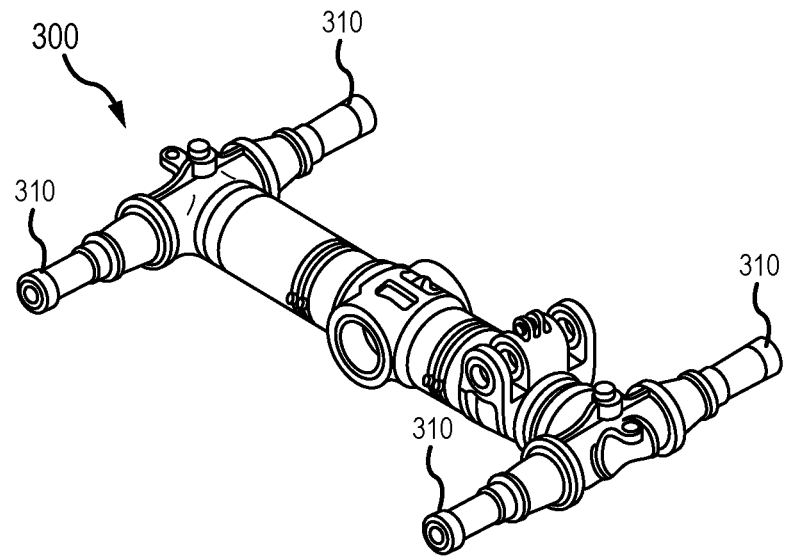
FIG. 3 illustrates a landing gear bogie, in accordance with various embodiments.
Figure 4:
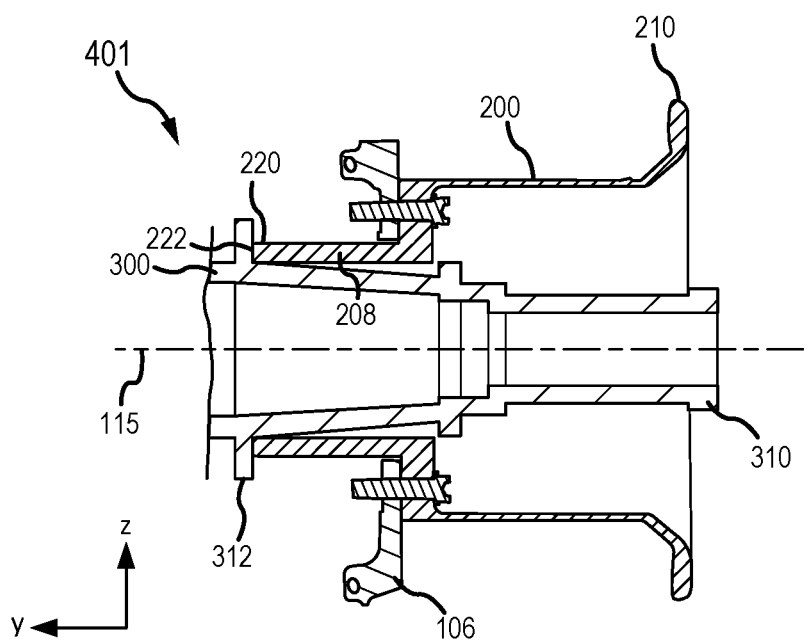
FIG. 4 illustrates a cross-sectional view of a landing gear arrangement including the torque tube of FIG. 2B and a portion of the landing gear bogie of FIG. 3, in accordance with various embodiments.

With reference to FIG. 3, a landing gear bogie 300 is illustrated, in accordance with various embodiments. Landing gear bogie 300 may comprise a plurality of axles 310. With reference to FIGS. 2A, 2B, 2C, 3 and 4, an aircraft landing gear arrangement 401 is illustrated, in accordance with various embodiments. Aircraft landing gear arrangement 401 may include landing gear bogie 300 and torque tube 200. Aircraft landing gear arrangement 401 may further include actuator mounting plate 106. Torque tube 200 may comprise a mating surface 222 disposed at second end 220. In the illustrated embodiment, second end 220 comprises an axially inboard end of torque tube 200. Mating surface 222 may comprise an axially facing surface whereby torque tube 200 engages landing gear bogie 300. FIG. 4 illustrates torque tube 200 installed onto landing gear bogie 300. Axle 310 may extend at least partially through torque tube 200 in the installed position. Torque tube 200 may be concentric with axle 310 in the installed position. A bogie flange 312 may extend from bogie 300. In various embodiments, bogie flange may be concentric with axle 310. Bogie flange 312 may be located axially inboard (positive y-direction) of mating surface 222. Mating surface 222 may mount against bogie flange 312. In various embodiments, bogie flange 312 and mating surface 222 may comprise apertures through which fasteners may be inserted to fasten bogie flange 312 to second end 220. It is contemplated herein that second end 220 may comprise a flange (also referred to herein as a second flange) extending radially outward, by which second end 220 may be mounted to bogie flange 312.

In various embodiments, torque tube 200 may define a mechanical load path through which torque may be transferred from a brake stack, through torque tube 200, into landing gear bogie 300, via, for example, second end 220 and bogie flange 312. Stated another way, torque tube 200 is in mechanical communication with landing gear bogie 200. In various embodiments, torque tube 200 may define a thermal load path through which heat may be transferred from a brake stack, through torque tube 200, into landing gear bogie 300, via mating surface 222 and bogie flange 312.

With combined reference to FIG. 2A and FIG. 4, as force is applied to pressure plate 110 towards end plate 111 along the axis 115, causing rotating discs 112 and stators 114 to be compressed together, friction between rotating discs 112 and plurality of rotating discs 112 may generate heat which may be transferred to torque tube 200. Stated another way, torque tube 200 is in thermal communication with landing gear bogie 200. Mounting mating surface 222 against bogie flange 312 may provide a direct thermal load path through which heat may be transferred from torque tube 200 to landing gear bogie 300.

In various embodiments, torque tube 200, landing gear bogie 300, and actuator mounting plate 106 may comprise a metal material, such as steel, for example. Torque tube 200 may be manufactured via metal casting manufacturing methods, negative manufacturing methods, and/or additive manufacturing methods.

Figure 5A:
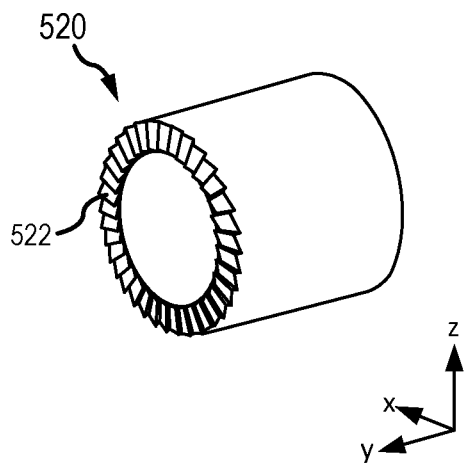
FIG. 5A illustrates an end portion of a torque tube having a crenulated axially facing mating surface, in accordance with various embodiments.

With reference to FIG. 5A, a second end 520 of a torque tube is illustrated, in accordance with various embodiments. In various embodiments, second end 220 of torque tube 200 may be similar to second end 520, with momentary reference to FIG. 2B. Second end 520 may comprise a mating surface 522, mating surface 522 being disposed on an axial facing surface. Mating surface 522 may comprise a crenulated surface.

Figure 5B:
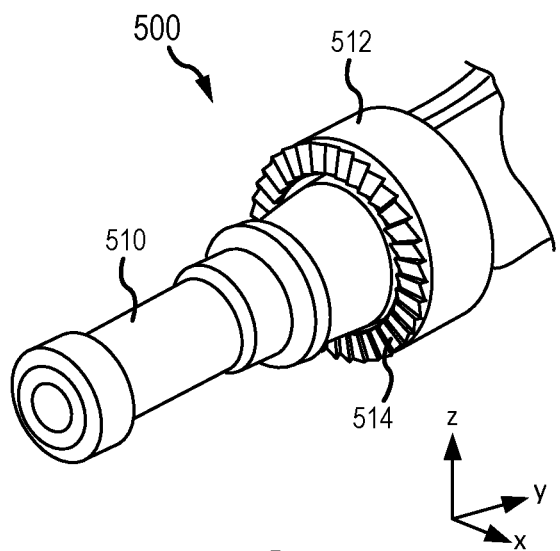
FIG. 5B illustrates an axle having a bogie flange corresponding to the mating surface of FIG. 5A, in accordance with various embodiments.

With reference to FIG. 5B, a portion of a landing gear bogie 500 is illustrated, in accordance with various embodiments. In various embodiments, landing gear bogie 500 may be similar to landing gear bogie 300, with momentary reference to FIG. 3. An axle 510 may extend from landing gear bogie 500. A bogie flange 512 may extend from landing gear bogie 500. Bogie flange 512 may comprise a mating surface 514. With combined reference to FIG. 5A and FIG. 5B, mating surface 514 may be complementary to mating surface 522. Mating surface 522 may engage mating surface 514 when second end 520 is installed over axle 510. In that regard, torque may be transferred from a torque tube to axle 510, via the interaction of mating surface 522 to mating surface 514.

Figure 6A:
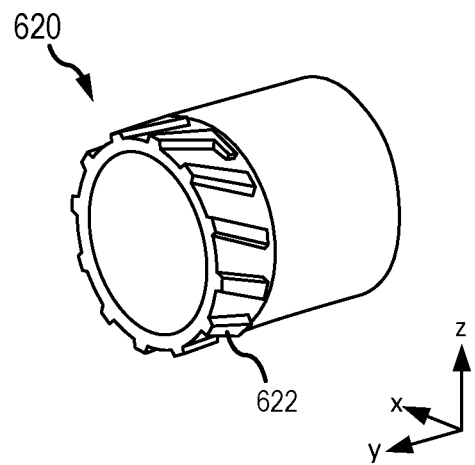
FIG. 6A illustrates an end portion of a torque tube having a crenulated radially outward facing mating surface, in accordance with various embodiments.

With reference to FIG. 6A, a second end 620 of a torque tube is illustrated, in accordance with various embodiments. In various embodiments, second end 220 of torque tube 200 may be similar to second end 620, with momentary reference to FIG. 2B. Second end 620 may comprise a mating surface 622. Mating surface 622 may comprise a radially outward facing surface. Mating surface 622 may comprise a crenulated surface. Mating surface 622 may comprise a plurality of primarily axially extending ridges.

Figure 6B:
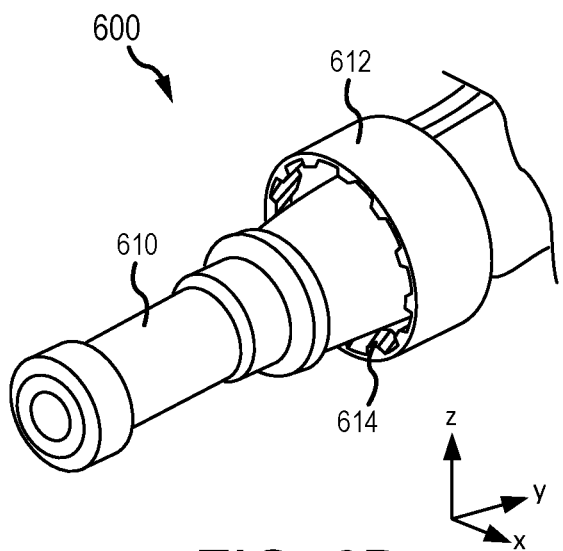
FIG. 6B illustrates an axle having a bogie flange corresponding to the mating surface of FIG. 6A, in accordance with various embodiments.

With reference to FIG. 6B, a portion of a landing gear bogie 600 is illustrated, in accordance with various embodiments. In various embodiments, landing gear bogie 300 may be similar to landing gear bogie 600, with momentary reference to FIG. 3. An axle 610 may extend from landing gear bogie 600. A bogie flange 612 may extend from landing gear bogie 500. Bogie flange 612 may comprise a mating surface 614. Mating surface 614 may comprise a radially inward facing surface, or an inner diameter (ID) surface. With combined reference to FIG. 6A and FIG. 6B, mating surface 614 may be complementary to mating surface 622. Mating surface 622 may engage mating surface 614 when second end 620 is installed over axle 610. In that regard, torque may be transferred from a torque tube to axle 610, via the interaction of mating surface 622 to mating surface 614.

Figure 7:
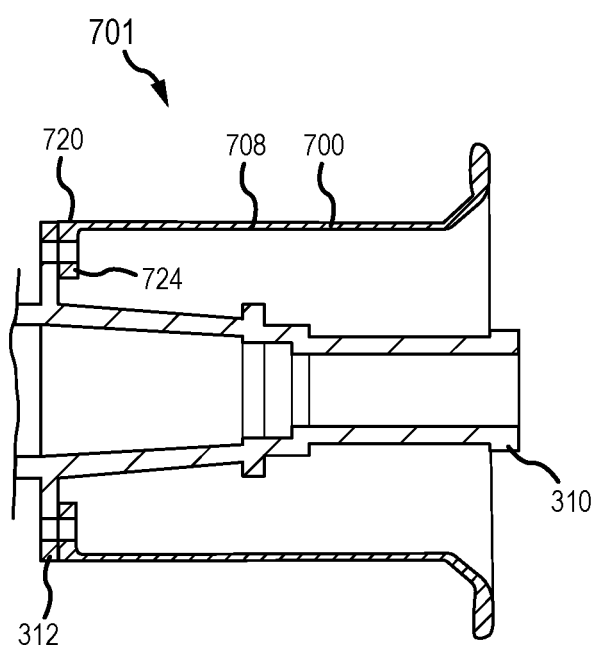
FIG. 7 illustrates a cross-sectional view of a landing gear arrangement having a torque tube comprising a tubular body having a constant diameter, in accordance with various embodiments.

With respect to FIG. 7, elements with like element numbering, as depicted in FIG. 3, are intended to be the same and will not necessarily be repeated for the sake of clarity.

With reference to FIG. 7, an aircraft landing gear arrangement 701 is illustrated, in accordance with various embodiments. Aircraft landing gear arrangement 701 includes torque tube 700 and axle 310. In various embodiments, torque tube 700 may be similar to torque tube 200, with momentary reference to FIG. 4. Instead of comprising a stepped portion 250, as illustrated in FIG. 2C, torque tube 700 may comprise a cylindrical body 708 comprising a constant diameter, as illustrated in FIG. 7. Furthermore, it is contemplated herein that cylindrical body 708 may comprise a frustoconical portion, or other geometries for sizing torque tube 700 for appropriate connection to axle 310. Similarly, it is contemplated herein that the size, such as the diameter for example, of bogie flange 312 may be sized or altered for appropriate connection to torque tube 700. Second end 720 of torque tube 700 may comprise a flange (also referred to herein as a second flange) 724. Flange 724 may extend radially inward from cylindrical body 708. Torque tube 700 may be mounted to bogie flange 312 via flange 724. Fasteners, such as bolts, may be passed through apertures in bogie flange 312 and flange 724. In various embodiments, bogie flange 312 and flange 724 comprise complementary mating surfaces, for example, complementary crenulated mating surfaces. For example, in various embodiments, the bogie flange 312 may comprise a mating surface such as mating surface 514 of FIG. 5B and flange 724 may comprise a mating surface such as mating surface 522 of FIG. 5A.

Figure 8A:
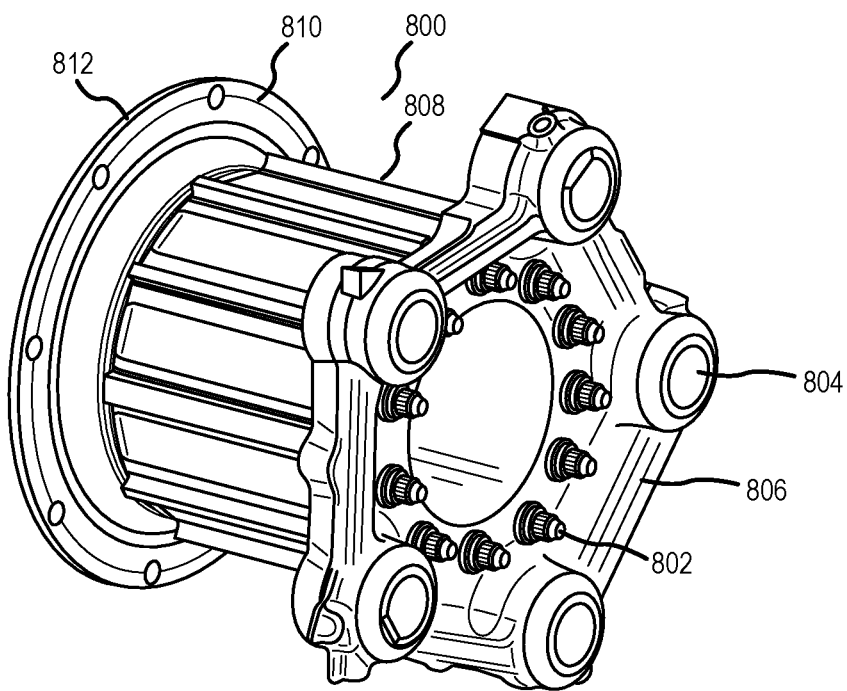
FIG. 8A and FIG. 8B illustrate an actuator plate mounted to a second end of a torque tube, wherein the first end of the torque tube is configured to mount to a landing gear bogie, in accordance with various embodiments.
Figure 8B:
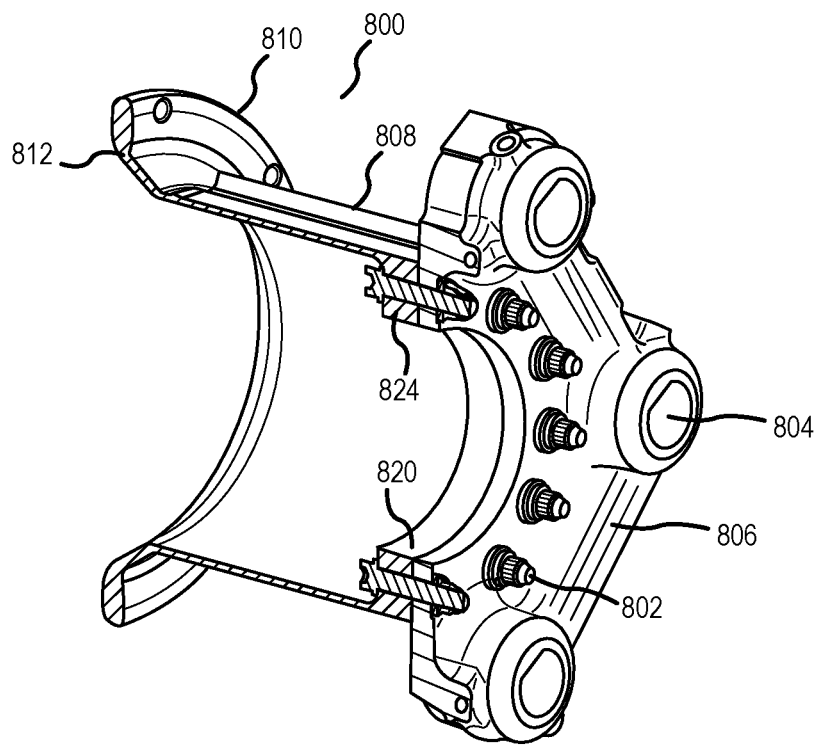

With combined reference to FIG. 8A and FIG. 8B, a torque tube 800 coupled to an actuator mounting plate 806 is illustrated, in accordance with various embodiments. Plurality of brake actuators 804 may be mounted to actuator mounting plate 806. Torque tube 800 may comprise a tubular body 808 extending between a first end 810 and a second end 820. A flange (also referred to herein as a first flange) 812 may be disposed at first end 810 of torque tube 800. In various embodiments, flange 812 may be configured to be coupled to end plate 111, with momentary reference to FIG. 2A.

In various embodiments, actuator mounting plate 806 may be coupled to torque tube 800 via a plurality of fasteners 802. Actuator mounting plate 806 may be coupled to second end 820. Actuator mounting plate 106 may be coupled to a flange (also referred to herein as a second flange) 824.

Figures 8C, 9:
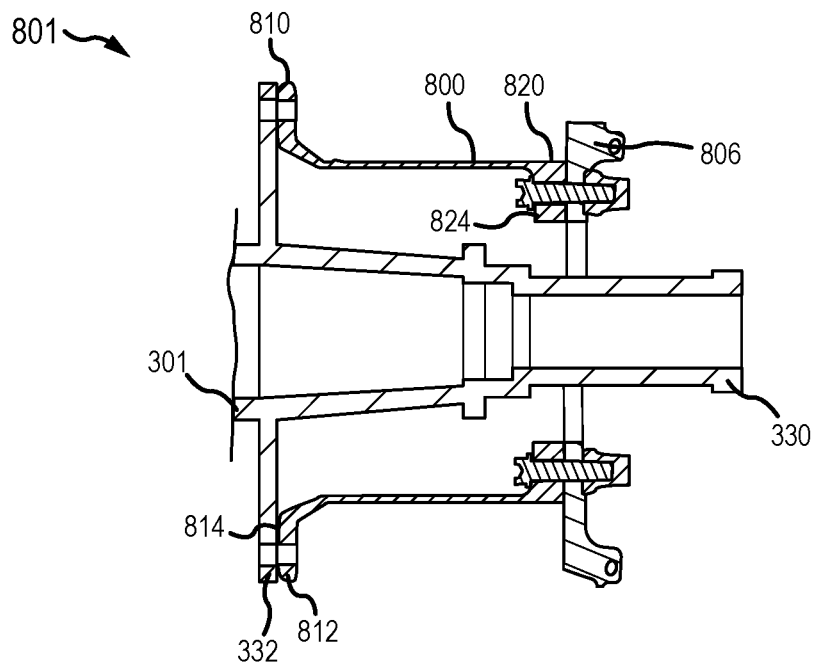
FIG. 8C illustrates a cross-sectional view of a landing gear arrangement having the actuator plate and torque tube of FIG. 8A, wherein the first end of the torque tube is mounted to a landing gear bogie, in accordance with various embodiments.
FIG. 9 illustrates a method of installing a torque tube to a landing gear bogie, in accordance with various embodiments.

With reference to FIG. 8C, an aircraft landing gear arrangement 801 is illustrated, in accordance with various embodiments. Aircraft landing gear arrangement 801 may comprise torque tube 800, landing gear bogie 301, and actuator mounting plate 806. Instead of being mounted to axle 330 at the second end, torque tube 800 may be mounted to bogie flange 332 at first end 810. In this regard, flange 812 may comprise a mating surface 814 configured to engage bogie flange 332. In various embodiments, it is contemplated herein that first end 810 may be modified according to second end 520 or second end 620, with momentary reference to FIG. 5A and FIG. 6A.

With reference to FIG. 9, a method 900 for installing a torque tube to a landing gear bogie is provided, in accordance with various embodiments. Method 900 includes positioning a torque tube to surround an axle (step 910). Method 900 includes moving the torque tube axially towards a landing gear bogie (step 920). Method 900 includes positioning a mating surface of the torque tube in contact with a bogie flange (step 930).

With combined reference to FIG. 4, and FIG. 9, step 910 may include positioning torque tube 200 to surround axle 310. Step 920 may include moving torque tube 200 axially towards (positive y-direction) landing gear bogie 300. Step 930 may include positioning mating surface 222 in contact with bogie flange 312.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft landing gear arrangement, comprising:
   a landing gear bogie comprising an axle and a bogie flange;
   a torque tube comprising a first flange disposed at a first end of the torque tube and a second flange disposed at a second end of the torque tube, the torque tube surrounding the axle and mechanically coupled to the bogie flange of the landing gear bogie via the first flange; and
   a brake stack surrounding the torque tube, wherein the brake stack comprises a plurality of rotating discs and a plurality of stators;
   wherein the second flange is configured to be coupled to an actuator mounting plate for mounting a brake actuator to the torque tube for compressing the plurality of rotating discs and the plurality of stators located between the first end of the torque tube and the second end of the torque tube;
   wherein the torque tube is configured to transfer torque from the brake stack to the landing gear bogie, and the torque tube is configured to be in thermal communication with the brake stack and is configured to transfer heat from the brake stack to the landing gear bogie.

2. The aircraft landing gear arrangement of claim 1, wherein the first flange comprises a mating surface in contact with the landing gear bogie.

3. The aircraft landing gear arrangement of claim 2, wherein the torque tube extends between a first end and a second end, the first flange being disposed at the second end.

4. The aircraft landing gear arrangement of claim 3, wherein the mating surface is on an axially facing surface of the first flange.

5. The aircraft landing gear arrangement of claim 3, wherein the mating surface is disposed on a radially outward facing surface of the first flange.

6. The aircraft landing gear arrangement of claim 1, wherein the torque tube defines a mechanical load path from the brake stack to the landing gear bogie via the first flange.

7. The aircraft landing gear arrangement of claim 1, wherein the torque tube defines a thermal load path from the brake stack to the landing gear bogie via the first flange.

8. The aircraft landing gear arrangement of claim 1, wherein the bogie flange extends from the landing gear bogie, the first flange mechanically coupled to the landing gear bogie via the bogie flange.

9. A method of installing a torque tube to a landing gear bogie, wherein the landing gear bogie comprises an axle and a bogie flange, and the torque tube comprises a first flange disposed at an inboard end of the torque tube and a second flange disposed at an outboard end of the torque tube, the method comprising:
  positioning the torque tube around an axle extending from the landing gear bogie;
  moving the torque tube axially towards the landing gear bogie until the torque tube mechanically engages the landing gear bogie;
  coupling the torque tube to the bogie flange via the first flange;
  moving a brake stack to surround the torque tube, wherein the brake stack comprises a plurality of rotating discs and a plurality of stators; and
  coupling an actuator mounting plate to the second flange for mounting a brake actuator to the outboard end of the torque tube for compressing the plurality of rotating discs and the plurality of stators located between the inboard end of the torque tube and the outboard end of the torque tube.

10. The method of claim 9, further comprising positioning a mating surface of the torque tube in contact with a bogie flange extending from the landing gear bogie, wherein the mating surface comprises at least one of an axially facing surface and a radially outward facing surface of the inboard end of the torque tube.

11. The method of claim 10, wherein the mating surface comprises a crenulated surface.

12. The method of claim 10, wherein the mating surface comprises a plurality of primarily axially extending ridges.

13. The method of claim 9,
  wherein the torque tube is configured to transfer torque from the brake stack to the landing gear bogie, and the torque tube is configured to be in thermal communication with the brake stack and is configured to transfer heat from the brake stack to the landing gear bogie.

* * * * *